W. H. DEILY.
Stove Pipe Damper.
No. 83,139. Patented Oct. 20, 1868.
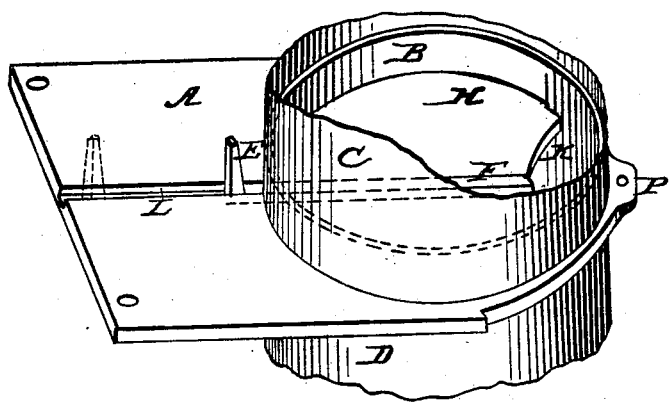
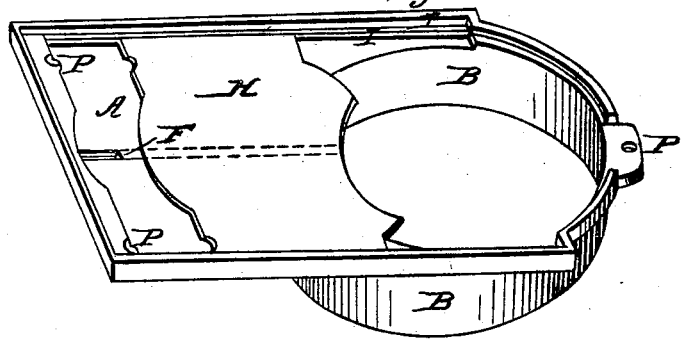
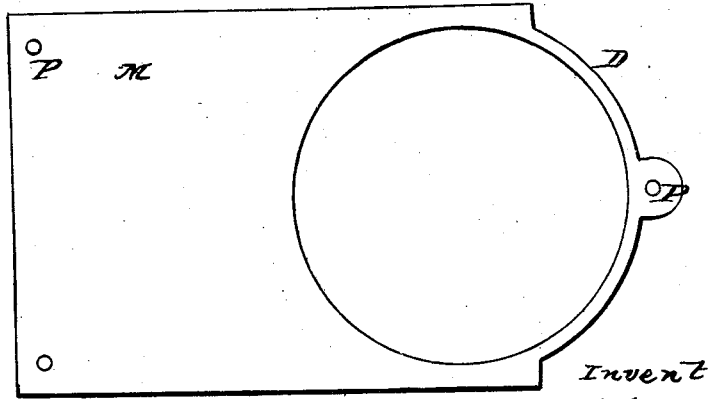
Witnesses:
Charles Waite
G. W. Nisbittus
Inventor:
W. H. Deily
By his attorney
G. L. Chapin

United States Patent Office.

WILLIAM H. DEILY, OF SYCAMORE, ILLINOIS.

Letters Patent No. 83,139, dated October 20, 1868.

IMPROVEMENT IN STOVE-PIPE DAMPERS.

The Schedule referred to in these Letters Patent and making part of the same.

*To all whom it may concern:*

Be it known that I, WILLIAM H. DEILY, of Sycamore, in the county of De Kalb, and State of Illinois, have invented an Improved Stove-Pipe Damper; and I do hereby declare that the following is a full, clear, and exact description of the construction and operation of the same, reference being had to the accompanying drawings, and letters marked thereon, making a part of this specification, in which—

Figure 1 is a perspective representation of my invention.

Figure 2, an inverted view of the upper plate, also showing the sliding damper.

Figure 3, a view of the inside of the bottom plate.

The nature of the present invention consists in the use of a two-part case, having flanges for supporting the joints of pipe, and a recess, in which a sliding damper is made to operate, and close or open the draught.

To enable others skilled in the art to make and use my invention, I have marked corresponding parts with similar letters, and will now give a detailed description.

A represents a cast-metal plate, having a circular flange, B, projecting upward, and used for supporting the lower end of the top joint of pipe, and it has a slot, L, made through it, in which a lug, E, is arranged to slide, said lug being rigidly attached to the damper H, and used to open and close it.

The damper is made either of cast or wrought metal, and it is constructed to run in a recess, I, which is made in the under side of the plate A, as clearly shown at fig. 2. And this recess is deep enough to receive a plate, M, fig. 3, which plate has a flange, D, fig. 1, for supporting the lower joint of pipe, and it is made to fit in a rabbet, J, in the flange of the recess, as shown at fig. 2. And it is held in place by means of bolts or screws, put through the holes P P, &c.

A rib, F, is rigidly fastened to the top of the damper, and it is made to slide in the slot L, and thus operates as a guide, and prevents the necessity of fitting the edges of the damper to run against the flanges of the recess.

The damper, shown in the drawings, is so constructed as to leave a small opening for gas and smoke to escape when it is closed, but other forms, other than that shown, may be used, as the necessity of any particular case may require.

Operation.

The flanges B and D should be placed inside of the joints of the pipe, and the plate A turned round to a convenient point for reaching the lug E, and the device is then ready for use.

I claim that this damper can be put in position for use much more readily than those which have rods passing through the pipe, and that it is always free from soot and ashes, for, when it is opened, any substance which may have adhered to it is removed.

Having thus described my invention,

What I claim, and desire to secure by Letters Patent, is—

The two-part case, formed by the parts A and M, having flanges D B for supporting the joints of pipe, and a recess inside, in which a damper, H, is made to operate for regulating the draught, substantially as and for the purpose set forth.

W. H. DEILY.

Witnesses:
CHARLES WAITE,
G. W. NESBITT, M. D.